(12) United States Patent
Sampsell

(10) Patent No.: US 7,845,841 B2
(45) Date of Patent: Dec. 7, 2010

(54) ANGLE SWEEPING HOLOGRAPHIC ILLUMINATOR

(75) Inventor: Jeffrey B. Sampsell, San Jose, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 0 days.

(21) Appl. No.: 11/467,879

(22) Filed: Aug. 28, 2006

(65) Prior Publication Data

US 2008/0049450 A1 Feb. 28, 2008

(51) Int. Cl.
*F21V 7/22* (2006.01)
*G03H 1/00* (2006.01)

(52) U.S. Cl. .................. 362/625; 362/624; 362/627; 359/34

(58) Field of Classification Search .............. 362/615, 362/603, 606, 607, 619, 625, 626, 620, 561, 362/612, 555, 511, 330; 359/34, 13, 14, 359/15, 32, 33
See application file for complete search history.

(56) References Cited

U.S. PATENT DOCUMENTS

| | | | |
|---|---|---|---|
| 3,924,929 A | 12/1975 | Holmen | |
| 4,375,312 A | 3/1983 | Tangonan | |
| 4,378,567 A | 3/1983 | Mir | |
| 4,850,682 A * | 7/1989 | Gerritsen | 349/201 |
| 4,918,577 A | 4/1990 | Furudate | |
| 4,974,942 A | 12/1990 | Gross | |
| 5,050,946 A | 9/1991 | Hathaway | |
| 5,226,099 A | 7/1993 | Mignardi | |
| 5,293,272 A | 3/1994 | Jannson et al. | |
| 5,339,179 A | 8/1994 | Rudisill et al. | |
| 5,398,125 A | 3/1995 | Willett | |
| 5,452,385 A | 9/1995 | Izumi | |
| 5,459,610 A | 10/1995 | Bloom et al. | |
| 5,467,417 A * | 11/1995 | Nakamura et al. | 385/36 |
| 5,481,385 A | 1/1996 | Zimmerman et al. | |
| 5,515,184 A | 5/1996 | Caulfield | |
| 5,555,160 A | 9/1996 | Tawara | |
| 5,569,565 A | 10/1996 | Kawakami et al. | |
| 5,592,332 A | 1/1997 | Nishio | |
| 5,594,830 A * | 1/1997 | Winston et al. | 385/146 |

(Continued)

FOREIGN PATENT DOCUMENTS

CN 1381752 A 11/2002

(Continued)

OTHER PUBLICATIONS

Fan et al., "Channel Drop Filters in Photonic Crystals", Optics Express, vol. 3, No. 1, 1998.

(Continued)

*Primary Examiner*—Ismael Negron
(74) *Attorney, Agent, or Firm*—Knobbe, Martens, Olson & Bear, LLP

(57) ABSTRACT

Light guides of various shapes are configured to adjust the angle of the individual light rays in a bundle of light within the light guide so that the angle of the respective rays are adjusted towards an acceptance angle of a hologram embedded within the light guide. The hologram embedded in the light guide is configured to eject individual rays towards the display elements when the respective rays are within a range of acceptance angles.

43 Claims, 11 Drawing Sheets

U.S. PATENT DOCUMENTS

| | | | |
|---|---|---|---|
| 5,647,036 A | 7/1997 | Deacon et al. | |
| 5,650,865 A * | 7/1997 | Smith | 359/15 |
| 5,659,410 A * | 8/1997 | Koike et al. | 349/62 |
| 5,671,314 A | 9/1997 | Gregory et al. | |
| 5,671,994 A | 9/1997 | Tai | |
| 5,673,128 A | 9/1997 | Ohta et al. | |
| 5,703,667 A * | 12/1997 | Ochiai | 349/65 |
| 5,735,590 A * | 4/1998 | Kashima et al. | 362/620 |
| 5,771,321 A | 6/1998 | Stern | |
| 5,783,614 A | 7/1998 | Chen | |
| 5,793,504 A | 8/1998 | Stoll | |
| 5,805,117 A | 9/1998 | Mazurek | |
| 5,808,708 A | 9/1998 | Oyama et al. | |
| 5,810,464 A * | 9/1998 | Ishikawa et al. | 362/620 |
| 5,815,229 A | 9/1998 | Shapiro | |
| 5,854,872 A * | 12/1998 | Tai | 385/133 |
| 5,877,874 A | 3/1999 | Rosenberg | |
| 5,883,684 A | 3/1999 | Millikan et al. | |
| 5,892,598 A | 4/1999 | Asakawa et al. | |
| 5,913,594 A | 6/1999 | Iimura | |
| 5,914,804 A | 6/1999 | Goossen | |
| 5,933,183 A | 8/1999 | Enomoto | |
| 5,956,106 A | 9/1999 | Petersen | |
| 5,982,540 A | 11/1999 | Koike | |
| 5,991,073 A | 11/1999 | Woodgate | |
| 5,999,239 A | 12/1999 | Larson | |
| 6,002,829 A | 12/1999 | Winston | |
| 6,014,192 A | 1/2000 | Lehureau | |
| 6,040,937 A | 3/2000 | Miles | |
| 6,048,071 A * | 4/2000 | Sawayama | 362/603 |
| 6,055,090 A | 4/2000 | Miles | |
| 6,072,620 A | 6/2000 | Shiono | |
| 6,073,034 A * | 6/2000 | Jacobsen et al. | 455/566 |
| 6,074,069 A | 6/2000 | Chao-Ching | |
| 6,091,469 A | 7/2000 | Naito | |
| 6,099,134 A | 8/2000 | Taniguchi | |
| 6,128,077 A | 10/2000 | Jovin | |
| 6,151,089 A | 11/2000 | Yang et al. | |
| 6,195,196 B1 | 2/2001 | Kimura | |
| 6,196,691 B1 * | 3/2001 | Ochiai | 362/617 |
| 6,199,989 B1 | 3/2001 | Maeda et al. | |
| 6,232,937 B1 * | 5/2001 | Jacobsen et al. | 345/87 |
| 6,243,149 B1 | 6/2001 | Swanson et al. | |
| 6,259,082 B1 | 7/2001 | Fujimoto et al. | |
| 6,273,577 B1 | 8/2001 | Goto | |
| 6,282,010 B1 | 8/2001 | Sulzbach | |
| 6,292,504 B1 | 9/2001 | Halmos | |
| 6,322,901 B1 | 11/2001 | Bawendi | |
| 6,323,892 B1 | 11/2001 | Mihara | |
| 6,371,623 B1 | 4/2002 | Toyoda | |
| 6,381,022 B1 | 4/2002 | Zavracky | |
| 6,407,785 B1 | 6/2002 | Yamazaki | |
| 6,412,969 B1 | 7/2002 | Torihara | |
| 6,454,452 B1 | 9/2002 | Sasagawa et al. | |
| 6,456,279 B1 | 9/2002 | Kubo | |
| 6,478,432 B1 | 11/2002 | Dyner | |
| 6,483,613 B1 | 11/2002 | Woodgate et al. | |
| 6,493,475 B1 | 12/2002 | Lin | |
| 6,504,589 B1 | 1/2003 | Kashima | |
| 6,512,626 B1 | 1/2003 | Schmidt | |
| 6,522,794 B1 | 2/2003 | Bischel et al. | |
| 6,538,813 B1 | 3/2003 | Magno | |
| D475,477 S | 6/2003 | Bennett, Jr. et al. | |
| 6,574,033 B1 | 6/2003 | Chui | |
| 6,577,429 B1 | 6/2003 | Kurtz | |
| 6,582,095 B1 | 6/2003 | Toyoda | |
| 6,592,234 B2 | 7/2003 | Epstein | |
| 6,598,987 B1 | 7/2003 | Parikka | |
| 6,603,520 B2 | 8/2003 | Umemoto | |
| 6,631,998 B2 | 10/2003 | Egawa et al. | |
| 6,636,322 B1 | 10/2003 | Terashita | |
| 6,636,358 B2 | 10/2003 | Umemoto et al. | |
| 6,642,913 B1 | 11/2003 | Kimura | |
| 6,643,067 B2 | 11/2003 | Miyamae | |
| 6,646,772 B1 | 11/2003 | Popovich et al. | |
| 6,650,455 B2 | 11/2003 | Miles | |
| 6,652,109 B2 | 11/2003 | Nakamura | |
| 6,657,683 B2 | 12/2003 | Richard | |
| 6,660,997 B2 | 12/2003 | Laberge | |
| 6,669,350 B2 | 12/2003 | Yamashita | |
| 6,674,562 B1 | 1/2004 | Miles | |
| 6,693,690 B2 | 2/2004 | Umemoto | |
| 6,697,403 B2 | 2/2004 | Lee et al. | |
| 6,709,123 B2 | 3/2004 | Flohr | |
| 6,738,194 B1 | 5/2004 | Ramirez | |
| 6,742,907 B2 | 6/2004 | Funamoto et al. | |
| 6,742,921 B2 | 6/2004 | Umemoto | |
| 6,747,801 B2 | 6/2004 | Umemoto | |
| 6,751,023 B2 | 6/2004 | Umemoto et al. | |
| 6,760,135 B1 | 7/2004 | Payne | |
| 6,761,461 B2 | 7/2004 | Mizutani et al. | |
| 6,773,126 B1 | 8/2004 | Hatjasalo et al. | |
| 6,778,746 B2 | 8/2004 | Charlton | |
| 6,792,293 B1 | 9/2004 | Awan et al. | |
| 6,794,119 B2 | 9/2004 | Miles | |
| 6,819,380 B2 | 11/2004 | Wen et al. | |
| 6,819,469 B1 | 11/2004 | Koba | |
| 6,822,745 B2 | 11/2004 | De Groot | |
| 6,841,787 B2 | 1/2005 | Almogy | |
| 6,852,396 B1 | 2/2005 | Mineo | |
| 6,853,418 B2 | 2/2005 | Suzuki et al. | |
| 6,862,141 B2 | 3/2005 | Olczak | |
| 6,864,882 B2 | 3/2005 | Newton | |
| 6,865,312 B2 | 3/2005 | Niv | |
| 6,879,354 B1 | 4/2005 | Sawayama | |
| 6,883,934 B2 | 4/2005 | Kawakami | |
| 6,891,530 B2 | 5/2005 | Umemoto | |
| 6,897,855 B1 | 5/2005 | Matthies | |
| 6,930,816 B2 | 8/2005 | Mochizuki | |
| 6,940,653 B2 | 9/2005 | Favalora et al. | |
| 6,951,401 B2 | 10/2005 | Van Hees et al. | |
| 6,951,403 B2 | 10/2005 | Bennett, Jr. | |
| 6,961,045 B2 | 11/2005 | Tsao | |
| 6,964,484 B2 | 11/2005 | Gupta et al. | |
| 6,967,779 B2 | 11/2005 | Fadel | |
| 6,999,235 B2 | 2/2006 | Nakamura | |
| 7,002,726 B2 | 2/2006 | Patel | |
| 7,009,754 B2 | 3/2006 | Huibers | |
| 7,010,212 B2 | 3/2006 | Emmons et al. | |
| 7,012,659 B2 | 3/2006 | Smith et al. | |
| 7,018,088 B2 * | 3/2006 | Yu et al. | 362/620 |
| 7,019,876 B2 | 3/2006 | Yang | |
| 7,025,461 B2 | 4/2006 | Veligdan | |
| 7,030,949 B2 | 4/2006 | Kashima | |
| 7,042,444 B2 | 5/2006 | Cok | |
| 7,042,643 B2 | 5/2006 | Miles | |
| 7,046,409 B2 | 5/2006 | Kihara | |
| 7,054,045 B2 | 5/2006 | McPheters | |
| 7,056,001 B2 | 6/2006 | Chuang | |
| 7,061,226 B2 | 6/2006 | Durr | |
| 7,064,875 B2 | 6/2006 | Kawano | |
| 7,072,093 B2 | 7/2006 | Piehl | |
| 7,072,096 B2 | 7/2006 | Holman et al. | |
| 7,110,158 B2 | 9/2006 | Miles | |
| 7,113,339 B2 | 9/2006 | Taguchi | |
| 7,123,216 B2 | 10/2006 | Miles | |
| 7,138,984 B1 | 11/2006 | Miles | |
| 7,142,347 B2 | 11/2006 | Islam | |
| 7,156,546 B2 | 1/2007 | Higashiyama | |
| 7,161,136 B1 | 1/2007 | Wenstrand | |
| 7,161,730 B2 | 1/2007 | Floyd | |
| 7,180,672 B2 | 2/2007 | Olczak | |
| 7,206,133 B2 | 4/2007 | Cassarly | |
| 7,212,345 B2 | 5/2007 | Wilson | |

| | | |
|---|---|---|
| 7,218,429 B2 | 5/2007 | Batchko |
| 7,218,812 B2 | 5/2007 | Maxwell |
| 7,221,418 B2 | 5/2007 | Lee |
| 7,223,010 B2 | 5/2007 | Min |
| 7,262,754 B1 | 8/2007 | Yamazaki |
| 7,262,916 B2 * | 8/2007 | Kao et al. .................... 359/599 |
| 7,324,284 B2 | 1/2008 | Olczak |
| 7,342,705 B2 | 3/2008 | Chui |
| 7,342,709 B2 | 3/2008 | Lin |
| 7,346,251 B2 | 3/2008 | Bose |
| 7,352,501 B2 | 4/2008 | Chopra et al. |
| 7,352,940 B2 | 4/2008 | Charters |
| 7,355,780 B2 | 4/2008 | Chui |
| 7,357,552 B2 | 4/2008 | Takada |
| 7,357,557 B2 | 4/2008 | Miyashita |
| 7,359,011 B2 | 4/2008 | Hamada |
| 7,360,899 B2 | 4/2008 | McGuire |
| 7,366,393 B2 | 4/2008 | Cassarly et al. |
| 7,377,678 B2 | 5/2008 | Huang |
| 7,380,969 B2 | 6/2008 | Yamashita |
| 7,380,970 B2 * | 6/2008 | Hwang et al. ............... 362/620 |
| 7,389,476 B2 | 6/2008 | Senda et al. |
| 7,417,784 B2 | 8/2008 | Sasagawa |
| 7,450,295 B2 | 11/2008 | Tung |
| 7,456,805 B2 | 11/2008 | Ouderkirk |
| 7,477,809 B1 | 1/2009 | Tan et al. |
| 7,508,571 B2 | 3/2009 | Gally |
| 7,515,336 B2 | 4/2009 | Lippey |
| 7,532,800 B2 | 5/2009 | Iimura |
| 7,545,569 B2 | 6/2009 | Cassarly |
| 7,561,133 B2 | 7/2009 | Mestha |
| 7,564,612 B2 | 7/2009 | Chui |
| 7,603,001 B2 | 10/2009 | Wang |
| 7,630,123 B2 | 12/2009 | Kothari |
| 7,663,714 B2 | 2/2010 | Haga et al. |
| 7,706,050 B2 | 4/2010 | Sampsell |
| 7,733,439 B2 | 6/2010 | Sampsell |
| 7,750,886 B2 | 7/2010 | Sampsell |
| 2001/0003504 A1 | 6/2001 | Ishihara |
| 2001/0010630 A1 | 8/2001 | Umemoto |
| 2001/0019380 A1 | 9/2001 | Ishihara |
| 2001/0019479 A1 | 9/2001 | Nakabayashi et al. |
| 2001/0022636 A1 | 9/2001 | Yang et al. |
| 2001/0030861 A1 * | 10/2001 | Oda et al. ..................... 362/31 |
| 2001/0049061 A1 | 12/2001 | Nakagaki et al. |
| 2001/0055208 A1 | 12/2001 | Kimura |
| 2002/0006036 A1 | 1/2002 | Egawa |
| 2002/0024711 A1 | 2/2002 | Miles |
| 2002/0034071 A1 | 3/2002 | Mabuchi |
| 2002/0044445 A1 | 4/2002 | Bohler |
| 2002/0051354 A1 | 5/2002 | Egawa |
| 2002/0054258 A1 | 5/2002 | Kondo et al. |
| 2002/0054424 A1 | 5/2002 | Miles |
| 2002/0075555 A1 | 6/2002 | Miles |
| 2002/0080465 A1 | 6/2002 | Han |
| 2002/0105699 A1 | 8/2002 | Miracky et al. |
| 2002/0106182 A1 | 8/2002 | Kawashima |
| 2002/0126364 A1 | 9/2002 | Miles |
| 2002/0135560 A1 | 9/2002 | Akaoka |
| 2002/0149584 A1 | 10/2002 | Simpson |
| 2002/0154256 A1 | 10/2002 | Gotoh |
| 2002/0172039 A1 * | 11/2002 | Inditsky ...................... 362/231 |
| 2003/0012009 A1 | 1/2003 | Suzuki |
| 2003/0016930 A1 | 1/2003 | Inditsky |
| 2003/0030764 A1 | 2/2003 | Lee |
| 2003/0043157 A1 | 3/2003 | Miles |
| 2003/0067760 A1 * | 4/2003 | Jagt et al. ..................... 362/31 |
| 2003/0071947 A1 | 4/2003 | Shiraogawa |
| 2003/0081154 A1 | 5/2003 | Coleman |
| 2003/0083429 A1 | 5/2003 | Smith |
| 2003/0086030 A1 | 5/2003 | Taniguchi |
| 2003/0086031 A1 | 5/2003 | Taniguchi |
| 2003/0090887 A1 | 5/2003 | Igarashi |
| 2003/0095401 A1 | 5/2003 | Hanson |
| 2003/0098957 A1 | 5/2003 | Haldiman |
| 2003/0099118 A1 | 5/2003 | Saitoh |
| 2003/0103177 A1 | 6/2003 | Maeda |
| 2003/0103344 A1 | 6/2003 | Niida |
| 2003/0123245 A1 | 7/2003 | Parker |
| 2003/0151821 A1 | 8/2003 | Favalora |
| 2003/0160919 A1 | 8/2003 | Suzuki et al. |
| 2003/0161040 A1 | 8/2003 | Ishii |
| 2003/0169385 A1 | 9/2003 | Okuwaki |
| 2003/0184690 A1 | 10/2003 | Ogiwara |
| 2003/0184989 A1 | 10/2003 | Matsumoto et al. |
| 2003/0193630 A1 | 10/2003 | Chiou |
| 2003/0210222 A1 | 11/2003 | Ogiwara et al. |
| 2003/0210363 A1 | 11/2003 | Yasukawa |
| 2003/0210367 A1 | 11/2003 | Nakano et al. |
| 2003/0214728 A1 | 11/2003 | Olczak |
| 2003/0231483 A1 | 12/2003 | Higashiyama |
| 2004/0001169 A1 | 1/2004 | Saiki et al. |
| 2004/0017599 A1 | 1/2004 | Yang |
| 2004/0027315 A1 | 2/2004 | Senda et al. |
| 2004/0032401 A1 | 2/2004 | Nakazawa |
| 2004/0032659 A1 | 2/2004 | Drinkwater |
| 2004/0042233 A1 | 3/2004 | Suzuki |
| 2004/0070711 A1 | 4/2004 | Wen et al. |
| 2004/0080938 A1 | 4/2004 | Holman |
| 2004/0085748 A1 | 5/2004 | Sugiura |
| 2004/0090765 A1 * | 5/2004 | Yu et al. ....................... 362/31 |
| 2004/0100796 A1 | 5/2004 | Ward |
| 2004/0109305 A1 | 6/2004 | Chisholm |
| 2004/0125048 A1 | 7/2004 | Fukuda |
| 2004/0135494 A1 | 7/2004 | Miyatake |
| 2004/0170373 A1 | 9/2004 | Kim |
| 2004/0174583 A1 | 9/2004 | Chen et al. |
| 2004/0207995 A1 * | 10/2004 | Park et al. ..................... 362/31 |
| 2004/0228112 A1 | 11/2004 | Takata |
| 2004/0246743 A1 | 12/2004 | Lee |
| 2005/0002082 A1 | 1/2005 | Miles |
| 2005/0024849 A1 | 2/2005 | Parker et al. |
| 2005/0041175 A1 | 2/2005 | Akiyama |
| 2005/0046011 A1 | 3/2005 | Chen |
| 2005/0069254 A1 | 3/2005 | Schultheis |
| 2005/0120553 A1 | 6/2005 | Brown |
| 2005/0133761 A1 * | 6/2005 | Thielemans ............ 252/299.61 |
| 2005/0141065 A1 | 6/2005 | Masamoto |
| 2005/0146897 A1 | 7/2005 | Mimura |
| 2005/0195468 A1 | 9/2005 | Sampsell |
| 2005/0206802 A1 | 9/2005 | Creemers |
| 2005/0231977 A1 | 10/2005 | Hayakawa |
| 2005/0248524 A1 | 11/2005 | Feng |
| 2005/0254771 A1 | 11/2005 | Yamashita |
| 2005/0259939 A1 | 11/2005 | Rinko |
| 2005/0271325 A1 | 12/2005 | Anderson |
| 2005/0286113 A1 | 12/2005 | Miles |
| 2006/0001942 A1 | 1/2006 | Chui |
| 2006/0002141 A1 | 1/2006 | Ouderkirk |
| 2006/0002675 A1 | 1/2006 | Choi |
| 2006/0024017 A1 | 2/2006 | Page |
| 2006/0044523 A1 | 3/2006 | Teijido |
| 2006/0050032 A1 | 3/2006 | Gunner |
| 2006/0051048 A1 | 3/2006 | Gardiner |
| 2006/0061705 A1 | 3/2006 | Onishi |
| 2006/0062016 A1 | 3/2006 | Dejima |
| 2006/0066541 A1 | 3/2006 | Gally |
| 2006/0066586 A1 | 3/2006 | Gally |
| 2006/0066783 A1 | 3/2006 | Sampsell |
| 2006/0066935 A1 | 3/2006 | Cummings |
| 2006/0072315 A1 | 4/2006 | Han et al. |
| 2006/0072339 A1 | 4/2006 | Li et al. |
| 2006/0077123 A1 | 4/2006 | Gaily |
| 2006/0077124 A1 | 4/2006 | Gally |
| 2006/0077514 A1 | 4/2006 | Sampsell |
| 2006/0077522 A1 | 4/2006 | Kothari |

| | | |
|---|---|---|
| 2006/0083028 A1 | 4/2006 | Sun et al. |
| 2006/0110090 A1 | 5/2006 | Ellwood |
| 2006/0114244 A1 | 6/2006 | Saxena |
| 2006/0126142 A1 | 6/2006 | Choi |
| 2006/0132383 A1 | 6/2006 | Gally |
| 2006/0164861 A1 | 7/2006 | Maeda |
| 2006/0181866 A1 | 8/2006 | Jung |
| 2006/0181903 A1* | 8/2006 | Okuwaki .................... 362/619 |
| 2006/0187676 A1 | 8/2006 | Ishikura |
| 2006/0198013 A1 | 9/2006 | Sampsell |
| 2006/0209012 A1 | 9/2006 | Hagood |
| 2006/0209385 A1 | 9/2006 | Liu |
| 2006/0215958 A1 | 9/2006 | Yeo |
| 2006/0265919 A1 | 11/2006 | Huang |
| 2006/0268574 A1 | 11/2006 | Jung |
| 2006/0274400 A1 | 12/2006 | Miles |
| 2006/0285356 A1 | 12/2006 | Tseng |
| 2007/0064294 A1 | 3/2007 | Hoshino et al. |
| 2007/0081360 A1 | 4/2007 | Bailey |
| 2007/0116424 A1 | 5/2007 | Ting |
| 2007/0147087 A1 | 6/2007 | Parker |
| 2007/0153243 A1 | 7/2007 | Mestha et al. |
| 2007/0177405 A1 | 8/2007 | Chan |
| 2007/0189036 A1 | 8/2007 | Chen |
| 2007/0196040 A1 | 8/2007 | Wang |
| 2007/0201234 A1 | 8/2007 | Ottermann |
| 2007/0210163 A1 | 9/2007 | Han |
| 2007/0229737 A1 | 10/2007 | Takeda |
| 2007/0229936 A1 | 10/2007 | Miles |
| 2007/0241340 A1 | 10/2007 | Pan |
| 2007/0253717 A1 | 11/2007 | Charters |
| 2007/0268695 A1 | 11/2007 | Seetzen |
| 2007/0279727 A1 | 12/2007 | Gandhi |
| 2007/0285406 A1 | 12/2007 | Kukulj |
| 2007/0292091 A1 | 12/2007 | Fujii |
| 2007/0297191 A1 | 12/2007 | Sampsell |
| 2008/0049445 A1 | 2/2008 | Harbers |
| 2008/0074402 A1 | 3/2008 | Cornish |
| 2008/0079687 A1 | 4/2008 | Cernasov |
| 2008/0084600 A1 | 4/2008 | Bita et al. |
| 2008/0084602 A1 | 4/2008 | Xu et al. |
| 2008/0090025 A1 | 4/2008 | Freking |
| 2008/0094853 A1 | 4/2008 | Kim |
| 2008/0100900 A1 | 5/2008 | Chui |
| 2008/0112039 A1 | 5/2008 | Chui |
| 2008/0151347 A1 | 6/2008 | Chui |
| 2008/0170414 A1 | 7/2008 | Wang |
| 2008/0180956 A1 | 7/2008 | Gruhlke |
| 2008/0192484 A1 | 8/2008 | Lee |
| 2008/0232135 A1 | 9/2008 | Kinder |
| 2008/0267572 A1 | 10/2008 | Sampsell |
| 2008/0285307 A1 | 11/2008 | Aylward |
| 2009/0050454 A1 | 2/2009 | Matsukawa |
| 2009/0086466 A1 | 4/2009 | Sugita |
| 2009/0090611 A1 | 4/2009 | Zeijlon |
| 2009/0097100 A1 | 4/2009 | Gally |
| 2009/0126777 A1 | 5/2009 | Khazeni et al. |
| 2009/0126792 A1 | 5/2009 | Gruhlke |
| 2009/0135469 A1 | 5/2009 | Lee et al. |
| 2009/0147332 A1 | 6/2009 | Bita et al. |
| 2009/0147535 A1 | 6/2009 | Mienko |
| 2009/0168459 A1 | 7/2009 | Holman |
| 2009/0190373 A1 | 7/2009 | Bita et al. |
| 2009/0196068 A1 | 8/2009 | Wang |
| 2009/0201301 A1 | 8/2009 | Mienko |
| 2009/0201565 A1 | 8/2009 | Bita et al. |
| 2009/0201571 A1 | 8/2009 | Gally |
| 2009/0231877 A1 | 9/2009 | Mienko |
| 2009/0251752 A1 | 10/2009 | Gruhlke |
| 2009/0251783 A1 | 10/2009 | Huibers |
| 2009/0296193 A1 | 12/2009 | Bita et al. |
| 2009/0303746 A1 | 12/2009 | Wang |
| 2009/0310208 A1 | 12/2009 | Wang |
| 2009/0320899 A1 | 12/2009 | Schiavoni |
| 2009/0323144 A1 | 12/2009 | Gruhlke |
| 2009/0323153 A1 | 12/2009 | Sampsell |
| 2010/0026727 A1 | 2/2010 | Bita et al. |
| 2010/0033988 A1 | 2/2010 | Chiu |
| 2010/0141557 A1 | 6/2010 | Gruhlke |
| 2010/0157406 A1 | 6/2010 | Gruhlke |

FOREIGN PATENT DOCUMENTS

| | | |
|---|---|---|
| CN | 1639596 A | 7/2005 |
| CN | 1755494 A | 4/2006 |
| CN | 1795403 A | 6/2006 |
| CN | 101226259 | 7/2008 |
| DE | 34 02 746 | 8/1985 |
| DE | 1 96 22 748 | 12/1997 |
| DE | 196 22 748 | 12/1997 |
| DE | 199 42 513 | 3/2001 |
| DE | 10228946 | 1/2004 |
| DE | 102007025092 | 12/2008 |
| EP | 0 278 038 | 8/1988 |
| EP | 0 539 099 | 4/1993 |
| EP | 0 590 511 | 4/1994 |
| EP | 0 621 500 | 10/1994 |
| EP | 0 822 441 | 2/1998 |
| EP | 0 879 991 | 11/1998 |
| EP | 0 907 050 | 4/1999 |
| EP | 0 957 392 | 11/1999 |
| EP | 0 984 314 | 3/2000 |
| EP | 1 089 115 | 4/2001 |
| EP | 1 093 105 | 4/2001 |
| EP | 1 113 218 | 7/2001 |
| EP | 1 116 987 | 7/2001 |
| EP | 1 127 984 | 8/2001 |
| EP | 1 143 270 | 10/2001 |
| EP | 1 199 512 A1 | 4/2002 |
| EP | 1 251 454 | 10/2002 |
| EP | 1 271 223 | 1/2003 |
| EP | 1 296 094 | 3/2003 |
| EP | 1 306 609 | 5/2003 |
| EP | 1 329 664 | 7/2003 |
| EP | 1 336 876 | 8/2003 |
| EP | 1 347 315 | 9/2003 |
| EP | 1 389 775 | 2/2004 |
| EP | 1 413 543 | 4/2004 |
| EP | 1 437 610 | 7/2004 |
| EP | 1 445 629 | 8/2004 |
| EP | 1 519 218 | 3/2005 |
| EP | 1 531 302 | 5/2005 |
| EP | 1 544 537 | 6/2005 |
| EP | 1 577 701 | 9/2005 |
| EP | 1 640 314 | 3/2006 |
| EP | 1 640 764 | 3/2006 |
| EP | 1 698 918 | 9/2006 |
| EP | 1 734 401 | 12/2006 |
| EP | 1 748 305 | 1/2007 |
| EP | 1 832 806 | 9/2007 |
| EP | 1 870 635 | 12/2007 |
| EP | 1 988 332 | 11/2008 |
| EP | 1 988 333 | 11/2008 |
| EP | 2 068 180 | 6/2009 |
| EP | 2 068 181 | 6/2009 |
| EP | 2 068 182 | 6/2009 |
| GB | 2 260 203 | 4/1993 |
| GB | 2 278 222 | 11/1994 |
| GB | 2 321 532 | 7/1998 |
| GB | 2 336 933 | 3/1999 |
| GB | 2 331 615 | 5/1999 |
| GB | 2 340 281 | 2/2000 |
| GB | 2 351 834 | 1/2001 |
| JP | 60 242408 | 12/1985 |
| JP | 62 009317 | 1/1987 |
| JP | 04 081816 | 3/1992 |

| | | |
|---|---|---|
| JP | 05 281479 | 10/1993 |
| JP | 08-18990 | 1/1996 |
| JP | 09 022012 | 1/1997 |
| JP | 09 0022012 | 1/1997 |
| JP | 09 160032 | 6/1997 |
| JP | 09 281917 | 10/1997 |
| JP | 09 281917 A | 10/1997 |
| JP | 09 311333 | 12/1997 |
| JP | 10 202948 | 8/1998 |
| JP | 11 174234 | 7/1999 |
| JP | 11174234 A | 7/1999 |
| JP | 11 211999 | 8/1999 |
| JP | 11 212919 * | 8/1999 |
| JP | 11 231321 | 8/1999 |
| JP | 11-232919 | 8/1999 |
| JP | 11 232919 | 8/1999 |
| JP | 2000 075293 | 3/2000 |
| JP | 2000 081848 | 3/2000 |
| JP | 2000 181367 | 6/2000 |
| JP | 2000 193933 | 7/2000 |
| JP | 2000 514568 | 10/2000 |
| JP | 2000 305074 | 11/2000 |
| JP | 2001-021883 | 1/2001 |
| JP | 2001 305312 | 10/2001 |
| JP | 2001 343514 | 12/2001 |
| JP | 2001/343514 A | 12/2001 |
| JP | 2003 007114 | 1/2002 |
| JP | 2002 062505 A | 2/2002 |
| JP | 2002 72284 | 3/2002 |
| JP | 2002 090549 | 3/2002 |
| JP | 2002 108227 | 4/2002 |
| JP | 2002 174780 | 6/2002 |
| JP | 2002 196151 | 7/2002 |
| JP | 2002 245835 | 8/2002 |
| JP | 2003 007114 | 1/2003 |
| JP | 2003 057652 | 2/2003 |
| JP | 2003 066451 | 3/2003 |
| JP | 2003 173713 | 6/2003 |
| JP | 2003 177336 | 6/2003 |
| JP | 2003 188959 | 7/2003 |
| JP | 2003-315694 | 11/2003 |
| JP | 2003 344881 | 12/2003 |
| JP | 2004-206049 | 7/2004 |
| JP | 2005-259365 | 9/2005 |
| JP | 2003 107993 | 4/2006 |
| JP | 2006 107993 | 4/2006 |
| JP | 2006 120571 | 5/2006 |
| JP | 2009 0300966 | 12/2009 |
| TW | 567388 | 12/2003 |
| WO | WO 95/01584 | 1/1995 |
| WO | WO 95/14256 | 5/1995 |
| WO | WO 96/16348 | 5/1996 |
| WO | WO 97/01240 | 1/1997 |
| WO | WO 97/16756 | 5/1997 |
| WO | WO 97/17628 | 5/1997 |
| WO | WO 98/19201 | 5/1998 |
| WO | WO 98/32047 | 7/1998 |
| WO | WO 98/35182 | 8/1998 |
| WO | WO 99/63394 | 12/1999 |
| WO | WO 00/50807 | 8/2000 |
| WO | WO 01/29148 | 4/2001 |
| WO | WO 01/57434 | 8/2001 |
| WO | WO 01/81994 | 11/2001 |
| WO | WO 01/84228 | 11/2001 |
| WO | WO 01/84229 | 11/2001 |
| WO | WO 02/06858 | 1/2002 |
| WO | WO 02/071132 A2 | 9/2002 |
| WO | WO 02/097324 | 12/2002 |
| WO | WO 03/007049 | 1/2003 |
| WO | WO 03/038509 | 5/2003 |
| WO | WO 03/056876 | 7/2003 |
| WO | WO 03/062912 | 7/2003 |
| WO | WO 2004/003643 | 1/2004 |
| WO | WO 2004/006003 | 1/2004 |
| WO | WO 2004/015489 | 2/2004 |
| WO | WO 2004-027514 | 4/2004 |
| WO | WO 2004/036270 | 4/2004 |
| WO | WO 2004/088372 | 10/2004 |
| WO | WO 2004/114418 | 12/2004 |
| WO | WO 2005/011012 | 2/2005 |
| WO | WO 2005/076051 | 8/2005 |
| WO | WO 2005/088367 | 9/2005 |
| WO | WO 2005/093490 | 10/2005 |
| WO | WO 2005/111669 | 11/2005 |
| WO | WO 2006/008702 | 1/2006 |
| WO | WO 2006/036451 | 4/2006 |
| WO | WO 2007/064133 | 6/2007 |
| WO | WO 2007/094558 | 8/2007 |
| WO | WO 2007/149474 | 12/2007 |
| WO | WO 2008/039229 | 4/2008 |
| WO | WO 2008/045200 | 4/2008 |
| WO | WO 2008/045207 | 4/2008 |
| WO | WO 2008/045218 | 4/2008 |
| WO | WO 2008/045222 | 4/2008 |
| WO | WO 2008/045224 | 4/2008 |
| WO | WO 2008/045310 | 4/2008 |
| WO | WO 2008/045311 | 4/2008 |
| WO | WO 2008/045312 | 4/2008 |
| WO | WO 2008/045362 | 4/2008 |
| WO | WO 2008/045363 | 4/2008 |
| WO | WO 2008/045364 | 4/2008 |
| WO | WO 2008/045462 | 4/2008 |
| WO | WO 2008/045463 | 4/2008 |
| WO | WO 2008/069877 | 6/2008 |
| WO | WO 2008/145096 | 12/2008 |
| WO | WO 2009/073555 | 6/2009 |
| WO | WO 2009/076075 | 6/2009 |

OTHER PUBLICATIONS

Neal T.D. et. al., "Surface Plasmon enhanced emission from dye doped polymer layers," Optics Express, Optical Society of America, vol. 13, No. 14, Jul. 2005.
Giles et al., " Silicon Mems Optical Switch Attenuator and Its Use in Lightwave Subsystems", IEEE Journal of Selected Topics in Quanum Electronics, vol. 5. No. 1, Jan./Feb., 1999, pp. 18- 25.
Little et al., "Vertically Coupled Microring Rosonator Channel Dropping Filter", IEEE Photonics Technology Letters, vol. 11, No. 2, 1999.
Magel, "Integrated Optic Devices Using Micromachined Metal Membranes", SPIE vol. 2686, 0-8194-2060-Mar. 1996.
Mehregany et al., "MEMS APPLICATIONS IN OPTICAL SYSTEMS", IEEE/LEOS 1996 Summer Topical Meetings, pp. 75-76, (Aug. 5-9, 1996).
Obi, et. al., "Fabrication of Optical Mems in Sol-Gel Materials," IEEE/LEOS International Conference on Optical Mems, Aug. 2002, Conference Digest, pp. 39-40.
OLINER, "Radiating Elements and Mutual Coupling," Microwave Scanning Antennas, vol. 2, 131-157 and pp. 190-194 (1966).
Goosen, "MEMS-Based Variable Optical Interference Devices," IEEE/LEOS International Conference on Optical Mems, Aug. 2000, Conference Digest, pp. 17-18.
Zhou et al., "Waveguide Panel Display Using Electromechanical Spatial Modulators" SID Digest, vol.XXIX, 1998.
Austrian Search Report for U.S. Appl. No. 11/064,143 dated Aug. 12, 2005 (Publication No. 2006/0132383).
Extended Search Report in European Patent U.S. Appl. No. 05255638.8 (European Publication 1 640 764) mailed on May 4, 2006.
ISR and WO for PCT/US2007/020969 dated Mar. 5, 2008 (PCT Publication WO 2008/045222).
ISR and Written Opinion for PCT/US2007/020911 dated Mar. 18, 2008 (PCT Publication No. WO 2008/045218).
ISR and WO for PCT/US2007/020680 dated Jul. 1, 2008 (PCT Publication WO 2008/045200).

ISR and WO for PCT/US2007/020736 dated Jul. 14, 2008 (PCT Publication No. WO 2008/045207).
ISR and Written Opinion for PCT/US2007/021378 dated Mar. 5, 2008 (PCT Publication No. WO 2008/045312).
ISR and WO for PCT/US2007/021376 dated Jun. 18, 2008 (PCT Publication No. WO 2008/045311).
ISR and Written Opinion for PCT/US2007/021460 dated May 14, 2008 (PCT Publication No. WO 2008/045364).
Partial International Search Report for PCT/US2007/022736 dated Jun. 16, 2008 (PCT Publication No. WO 2008/069877).
ISR and WO mailed on Dec. 13, 2007 in PCT/US2007/014358 (WO 2007/149474).
ISR and Written Opinion for PCT/US2007/021459 dated May 14, 2008 (PCT Publication No. WO 2008/045363).
ISR and Written Opinion for PCT/US2007/021375 dated May 14, 2008 (PCT Publication No. WO 2008/045310).
ISR and Written Opinion for PCT/US2007/021458 dated May 14, 2008 (PCT Publication No. WO 2008/045362).
ISR and Written Opinion for PCT/US2007/020999 dated Apr. 8, 2008 (PCT Publication No. WO 2008/045224).
ISR for PCT/US2005/006629 dated Jun. 6, 2005 (PCT Publication No. WO 2005/093490).
International Search Report for PCT/US2007/022736 dated Aug. 14, 2008 (PCT Publication No. WO 2008/069877).
International Search Report for PCT/US2005/031238 dated Dec. 14, 2005 (PCT Publication No. WO 2006/036451).
Austrian Search Report in U.S. Patent Appl. No. 11/041,020 dated May 9, 2005.
European Search Report in European Application No. 08153436.4 (Publication No. EP 1 988 332) dated Oct. 1, 2008.
European Search Report in European Application No. 08153770.6 (Publication No. EP 1 988 333) dated Sep. 29, 2008.
International Search Report and Written Opinion in International Application No. PCT/US2008/061046 dated Oct. 1, 2008.
Written Opinion for International Application No. PCT/US 07/04277 dated Apr. 3, 2008 (Publication No. WO 2008/039229).
European Search Report in European Application No. 05255711.3 dated Jan. 25, 2006.
International Search Report and Written Opinion in International Application No. PCT/US2007/021623 (Publication No. WO 2008/045463) dated Oct. 22, 2008.
International Search Report and Written Opinion in International Application No. PCT/US2007/021622 (Publication No. WO 2008/045462) dated Oct. 22, 2008.
Extended European Search Report in European Application No. 05255647.9 (Publication No. EP 1 640 314) dated Mar. 12, 2008.
International Search Report and Written Opinion in International Application No. PCT/US2005/002986 (Publication No. WO 2005/076051 ) dated Jun. 8, 2005.
Austrian Search Report in U.S. Appl. No. 11/036,965 dated Jul. 25, 2005.
Austrian Search Report in U.S. Appl. No. 11/040,824 dated Jul. 14, 2005.
ISR and Written Opinion for PCT/US2007/018639 dated Mar. 20, 2008 (PCT Publication No. WO 2008/027275)(Includes copies of EP 1 544 537 and JP 11 232919).
Response to Written Opinion, filed Jun. 25, 2008 (PCT Publication No. WO 2008/027275).
Communication under PCT Rule 66.6, mailed Jul. 30, 2008 (PCT Publication No. WO 2008/027275)(Machine translation of JP 11 232919 available at end of this document).
Communication under PCT Rule 66.6, mailed Aug. 14, 2008 (PCT Publication No. WO 2008/027275).
Response to Communication of Aug. 14, 2008, filed Sep. 11, 2008 (PCT Publication No. WO 2008/027275).
International Preliminary Report on Patentability for PCT/US2007/018639, dated Sep. 30, 2008 (PCT Publication No. WO 2008/027275).
International Preliminary Report on Patentability in PCT/US2007/018639 dated Sep. 30, 2008.
International Search Report and Written Opinion in PCT/US2007/021623(International Publication No. WO 2008/045463) dated Oct. 22, 2008.
International Search Report and Written Opinion in PCT/US2007/021622(International Publication No. WO 2008/045462) dated Oct. 22, 2008.
Partial International Search Report in PCT/US2008/086875 dated Apr. 16, 2009.
Extended European Search Report in App. No. 08153691.4 (European Publication: EP 2 068 182) dated Mar. 25, 2009.
Extended Search Report in European App. No. 08153690 (EP 2 068 181) dated Mar. 5, 2009.
International Search Report and. Written Opinion in PCT/US2008/085010 (International Publication: WO 2009/073555) dated Mar. 4, 2009.
Extended Search Report in European App. No. 08153686.4 (European Publication: EP 2 068 180) dated Apr. 17, 2009.
International Search Report and Written Opinion in PCT/US2008/085026 (International Publication: WO 2009/076075) dated Apr. 20, 2009.
Partial International Search Report and Written Opinion in PCT/US2009/033698 dated May 29, 2009.
Partial International Search Report in International App. No. PCT/US2009/033597 dated May 19, 2009.
Office Action in Chinese Patent Application No. 200780031875, dated Mar. 2, 2010.
Yan, et al., "Edge-Lighting Light Guide Plate Based on Micro-Prism for Liquid Crystal Display," Journal of Display Technology, vol. 5, No. 9, pp. 355-357, Sept. 2009.
Yu, et al., "Design Optimization and Stamper Fabrication of Light Guiding Plates Using Silicon Based Micro-Features," IEEE Symposium on DTIP of MEMS/MOEMS, Rome, Apr. 1-3, 2009.
US 7,619,822, 11/2009, Gruhike (withdrawn)
US 7,684,107, 03/2010, Xu et al. (withdrawn)

* cited by examiner

ANGLE SWEEPING HOLOGRAPHIC ILLUMINATOR

BACKGROUND

1. Field of the Invention

The Invention relates to systems and methods for providing light to display elements.

2. Description of the Related Technology

Microelectromechanical systems (MEMS) include micromechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

DETAILED DESCRIPTION

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Display elements, such as, e.g., interferometric modulating MEMS devices, LCDs, etc., may include a light source that is configured to light the display elements to an appropriate level for viewing. In combination with the light source, a light guide may be coupled to the array of display elements proximate the light source to distribute light across an array of display elements. Light guides may be positioned in various orientations with respect to the display elements, such as behind the display elements, e.g., a backlight, or in front of the display elements, e.g., a frontlight. In the systems and methods described herein, light guides of various shapes are configured to adjust the angle of the individual light rays in a bundle of light within the light guide so that the angle of the respective rays are adjusted towards an acceptance angle of a hologram embedded within the light guide. The hologram embedded in the light guide is configured to eject individual rays towards the display elements when the respective rays are within a range of acceptance angles.

Figure 1:
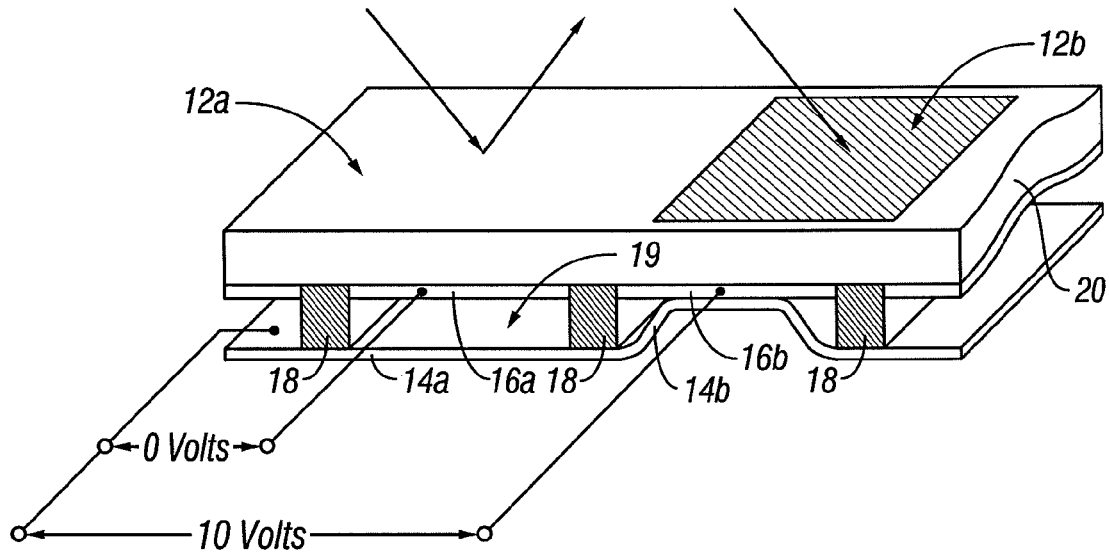
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
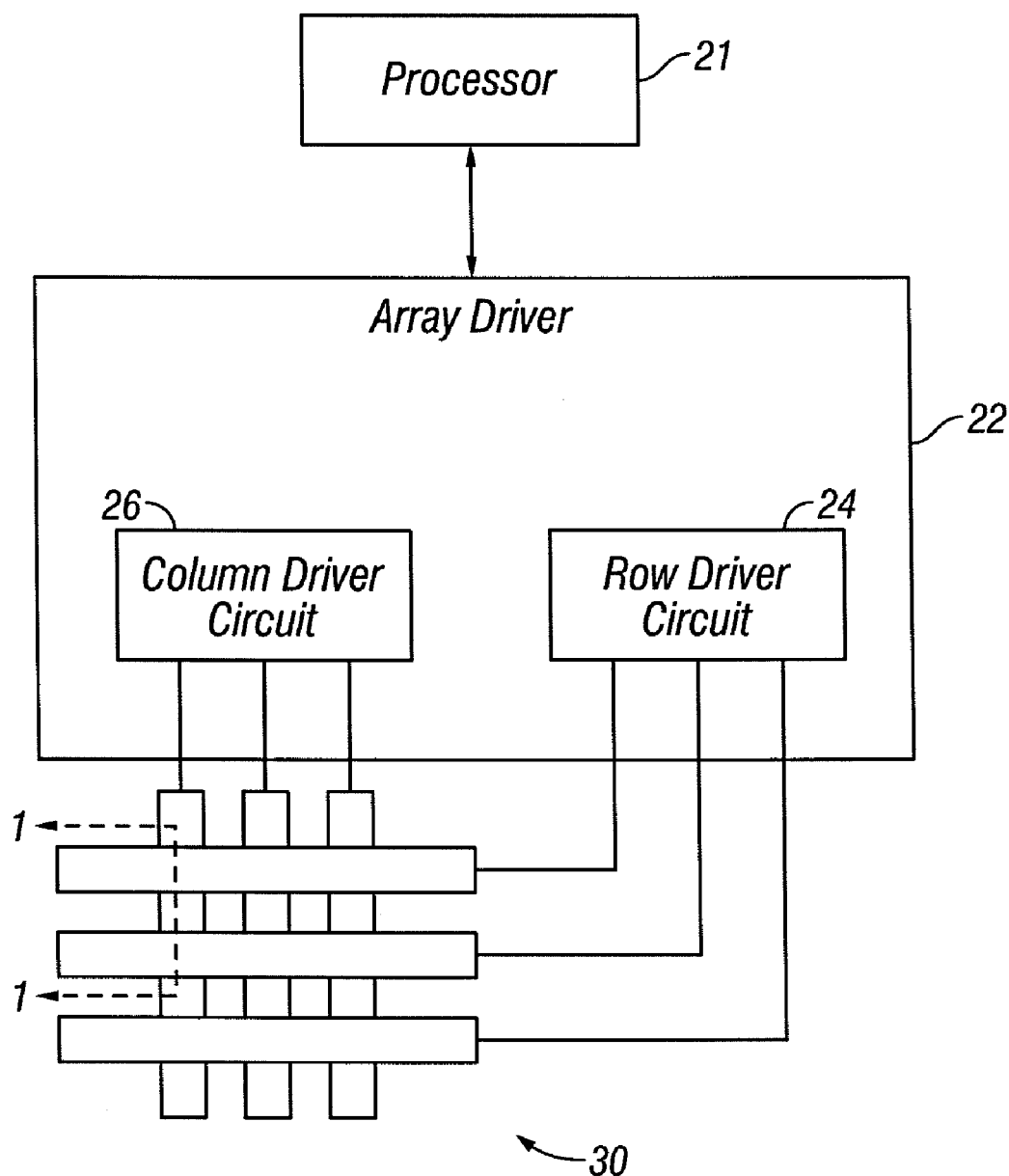
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
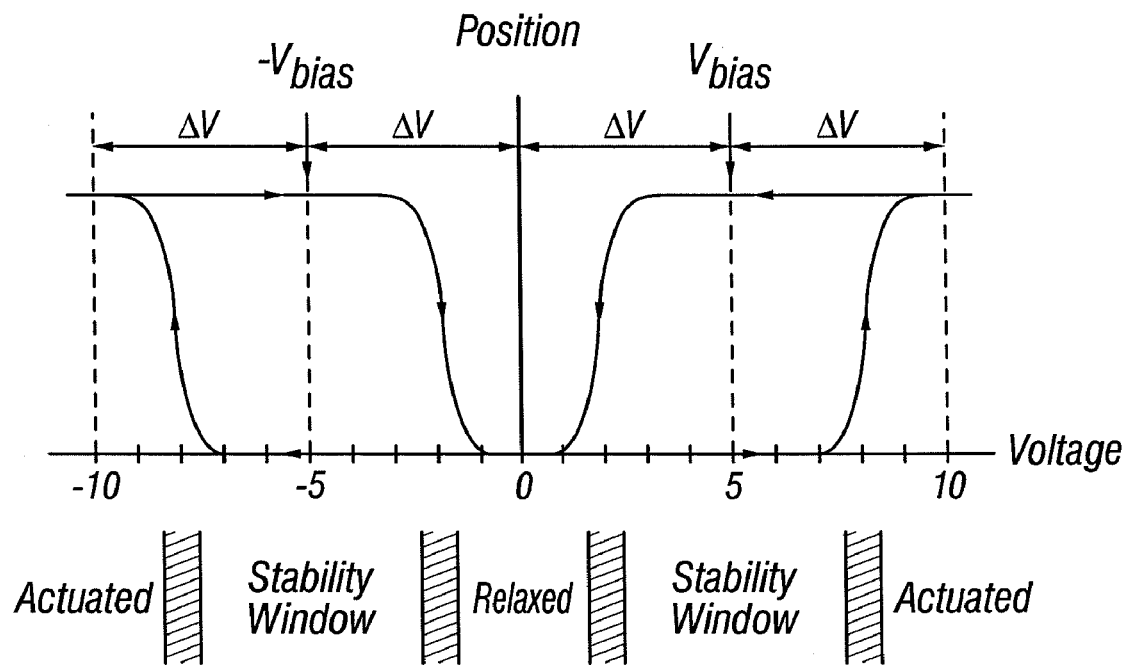
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
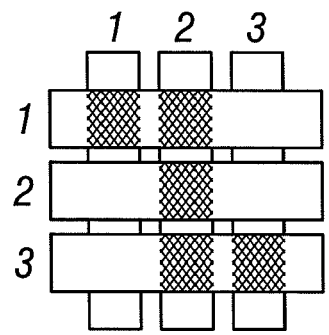
FIG. 5A illustrates one exemplary frame of display data in the 3×3 interferometric modulator display of FIG. 2.
Figure 5B:
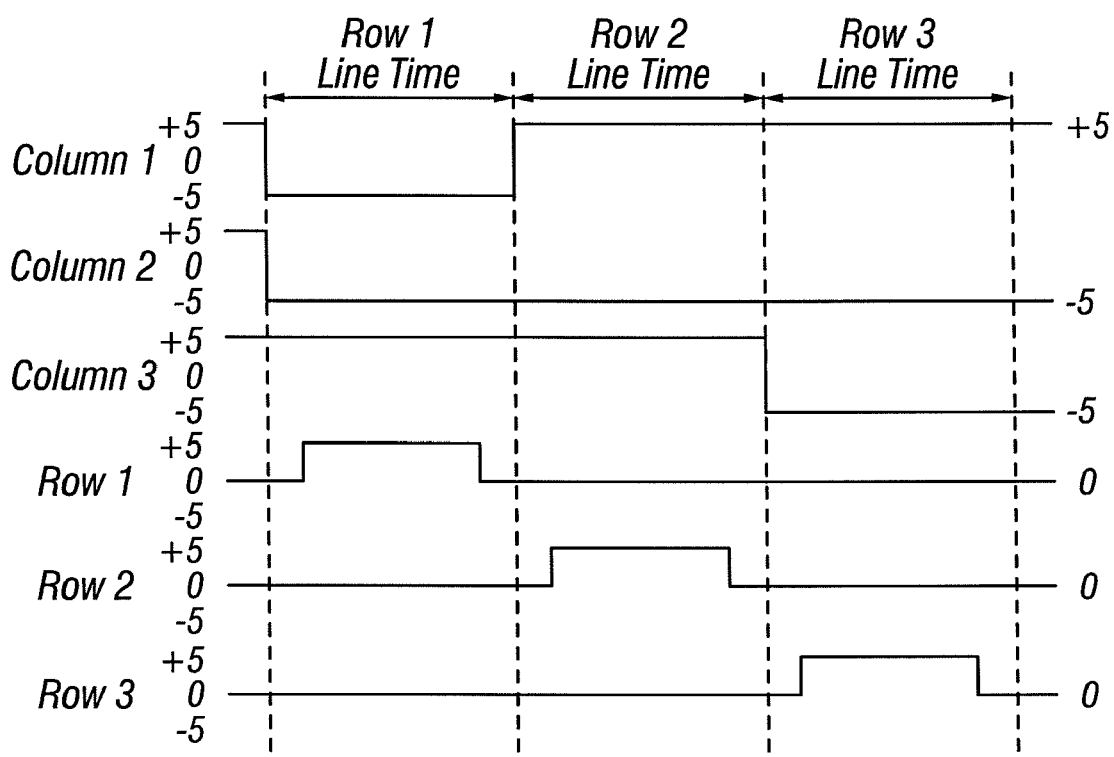
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts, respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
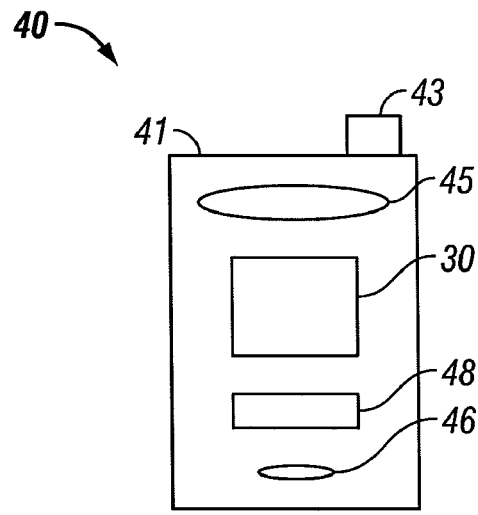
FIGS. 6A and 6B are system block diagrams illustrating an embodiment of a visual display device comprising a plurality of interferometric modulators.
Figure 6B:
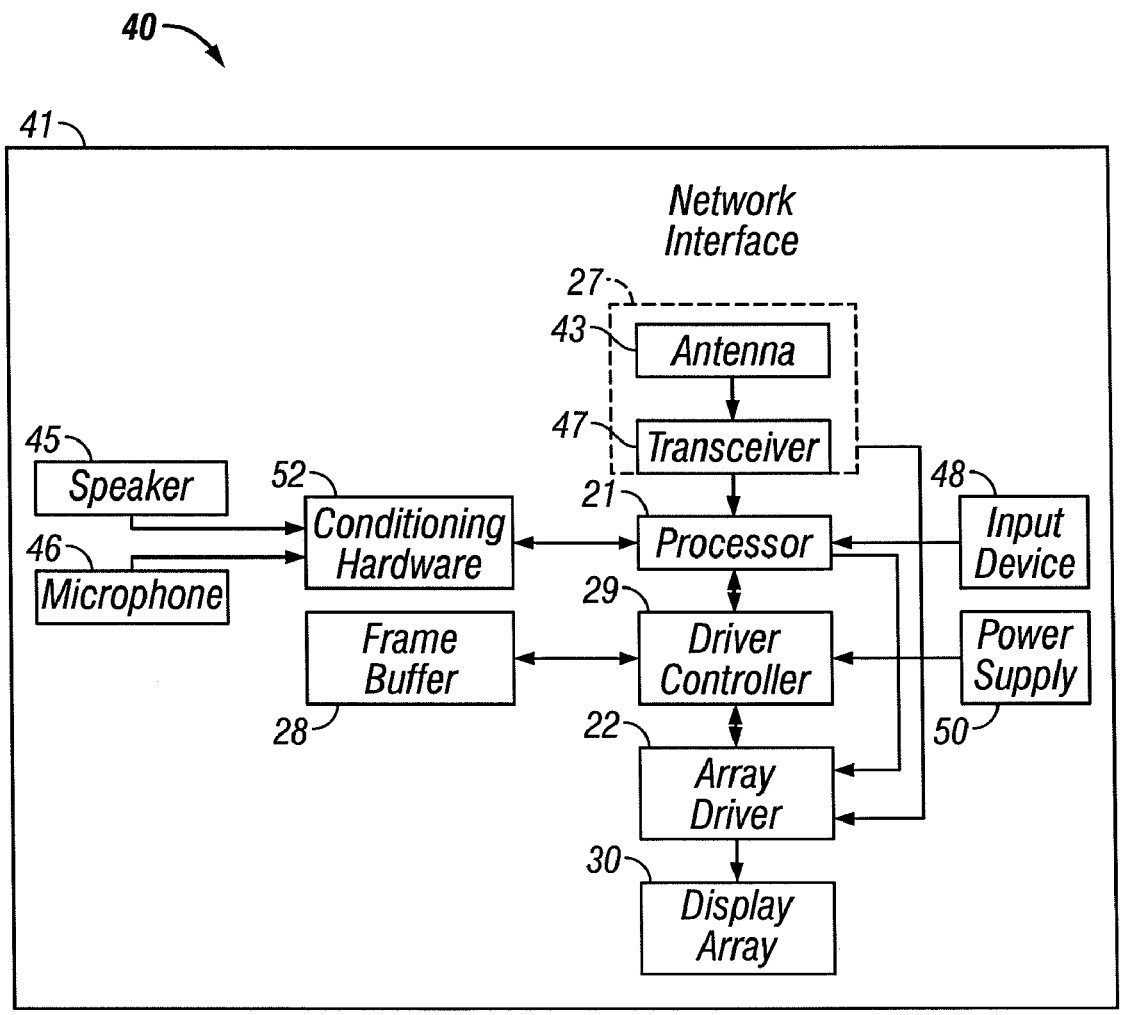

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
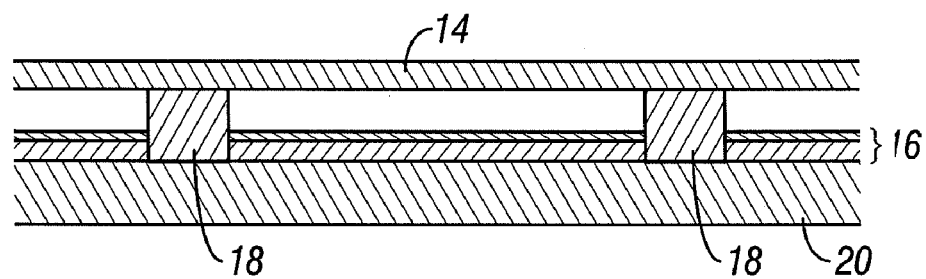
FIG. 7A is a cross section of the device of FIG. 1.
Figure 7B:
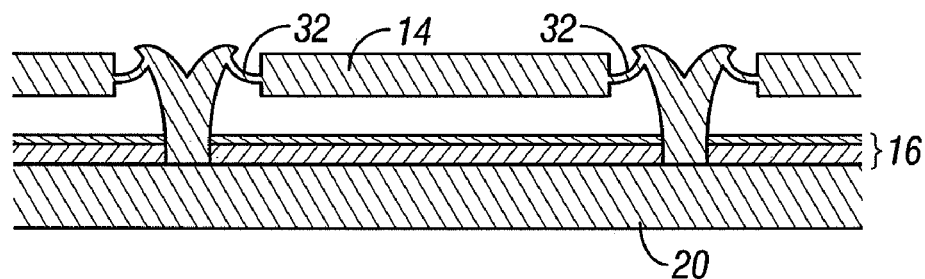
FIG. 7B is a cross section of an alternative embodiment of an interferometric modulator.
Figure 7C:
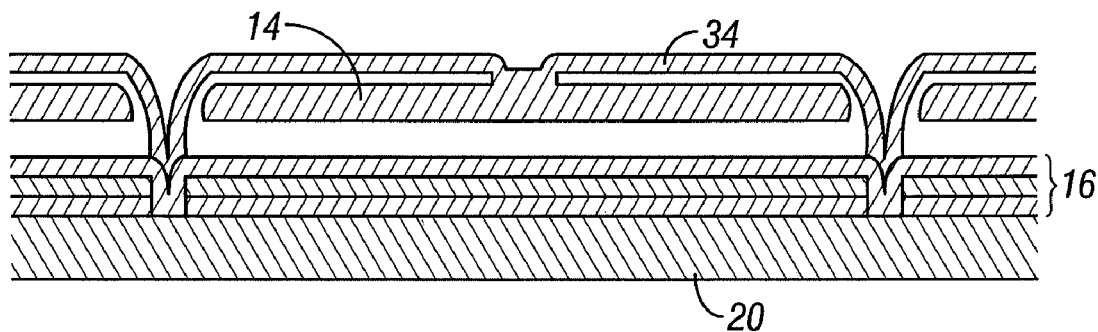
FIG. 7C is a cross section of another alternative embodiment of an interferometric modulator.
Figure 7D:
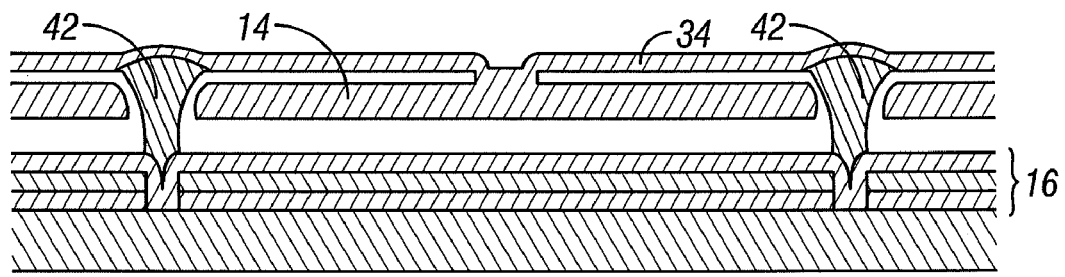
FIG. 7D is a cross section of yet another alternative embodiment of an interferometric modulator.
Figure 7E:
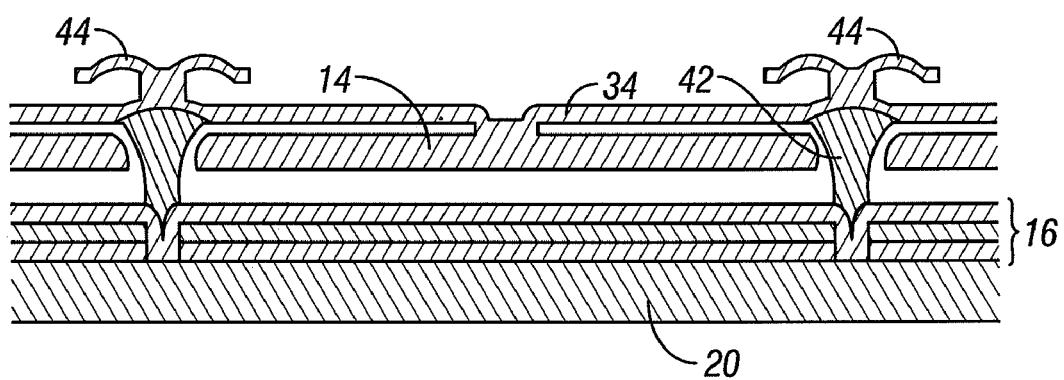
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8:
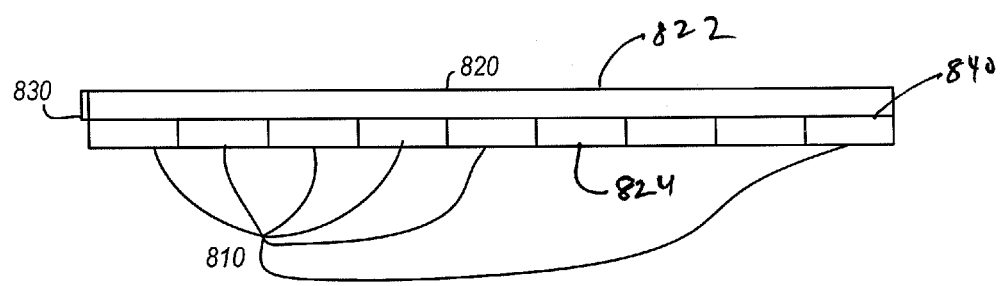
FIG. 8 is a cross section of an array of display elements having a light guide positioned so as to inject light into the display elements.

FIG. 8 is a cross section of an array of display elements 810 having a light guide 820 positioned so as to emit light into the display elements 810. The display elements 810 may comprise any reflective or partially reflective types of elements, such as, for example, LCD display elements or interferometric modulator display elements similar to those described above. In the embodiment of FIG. 8, a plurality of display elements 810 are arranged in an array configuration. As described above, many displays include arrays of individual display elements. Similarly, individual pixels of displays may comprise one or more display elements. In the embodiment of FIG. 8, the multiple display elements 810 may be part of a larger display, such as a display of a cell phone or PDA. A light guide 820 is positioned proximate each of the display elements 810 and is configured to propagate light injected into an edge thereof within the light guide. The light guide is further configured to eject the light propagating in the light guide into each of the display elements 810. A light source 830, such as an LED, is positioned proximate the light guide 820 and provides the light that travels through the light guide 820 and that is distributed onto the display elements 810. In other embodiments, the configurations of one or more light sources and light guides may be varied in order to provide light to an array of display elements. For example, in one embodiment, a linear array of light sources, such as LEDs, may extend along a length of a light guide. In another embodiment, an elongated linear light guide that is pumped at one end with light may be used to provide light to the display elements 810. Other light sources, such as CCFTs (Cold Cathode Fluorescent Tubes), for example, and other light guides known in the art, or later developed, may also be usable in conjunction with the systems and methods described herein.

In the embodiment of FIG. 8, the light guide 820 comprises a hologram 840 that is configured to eject light that is incident on the hologram 840 at an acceptance angle, out of the light guide toward the display elements. Although referred to herein as an acceptance angle, the acceptance angle may comprise a range of angles. For example, a hologram may be configured to eject light rays that are incident on the hologram within the range of 45-45.5 degrees. In other embodiments, the acceptance angles that are ejected by a hologram may be in the range of width less than about 0.2, 0.25, 0.5, 0.75, 1, or 2 degrees, for example. In one embodiment, the hologram 840 has substantially no effect on the light rays that propagate within the light guide at angles outside of the hologram's acceptance angle, and, therefore, rays that are emitted into the light guide 820 from the light source 830 at angles outside of the acceptance angle are not ejected by the hologram 840 onto the display devices 810. For example, if the acceptance angle of the hologram 840 is from 45-45.5 degrees and a ray that was emitted from the light source 830 propagates within the light guide at an angle of 40 degrees with respect to the hologram 840, because a first surface 822 and a second surface 824 of the light guide 820 are parallel, the angle of the ray with respect to the hologram 840 will remain at 40 degrees as the ray propagates through the light guide 820, reflecting alternatively from the first and second surfaces 822, 824. Accordingly, in the embodiment of FIG. 8, at least some of the light that is emitted into the light guide 820 is not ejected from the light guide 820 onto the display elements 810 because the rays are not within the range of acceptance angles of the hologram 840. In certain embodiments, the hologram 840 may comprise a surface hologram, volume hologram, or any other type of hologram.

Figure 9:
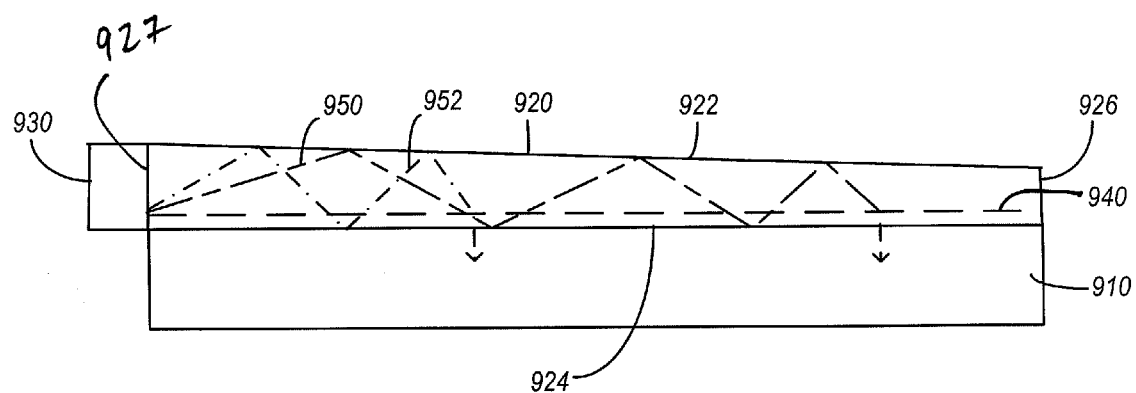
FIG. 9 is a cross section of an array of display elements having a tapered light guide comprising a hologram positioned proximate the display elements.

FIG. 9 is a cross section of an array of display elements 910 having a tapered light guide 920 comprising a hologram 940 positioned proximate the display elements 910. The light guide 920 of FIG. 9 comprises a first surface 922 and a second surface 924 that are positioned so that a distance between the first and second surface 922, 924 is smaller at a second end 926 of the light guide 920 than at a first end 927 of the light guide 920. This thickness variation in the light guide 920 advantageously causes angles of light reflected from the light guide 920 to be adjusted as the light propagates through the light guide 920. A difference in angles of the first and second surfaces 922, 924 is referred to herein as a taper angle. In the embodiment of FIG. 9, angles of light rays that are emitted from the light source 930 into the light guide 920 outside of the acceptance angle of the hologram 940 may be adjusted as the light rays propagate through the light guide 920, until the angles of respective light rays are within the acceptance angle of the hologram 940 and the light rays are ejected from the light guide 920 onto the display elements 910. Thus, the light guide 920 advantageously increases an amount of light that is within the acceptance angle of the hologram 940, and, therefore, increases an amount of light that is ejected from the light guide 920 without increasing the range of acceptance angles for the hologram 940. In general, a hologram with a wide acceptance angle will eject more angles of incident light, but undesirable visual artifacts may be created as well. The light guide 920 advantageously adjusts angles of light rays emitted into the light guide 920 so that rays emitted from the light source at a wide range of angles may be ejected from the light guide 920 at various locations of the light guide as the angles of the respective rays are adjusted towards an acceptance angle of the hologram 940. The adjustment of angles of the light rays within the light guide 920 also allows the use of a hologram 940 having a narrow acceptance angle, thus reducing the visual artifacts that are associated with a wider acceptance angle.

In one embodiment, the hologram 940 is designed to turn light rays propagating very near the total-internal-reflection (TIR) angle of the light guide 920. Thus, the light guide 920 is designed to migrate all propagating rays toward this angle as light moves through the light guide 920 away from the light source 930. Accordingly, light entering the light guide 920 from the light source 930 near the TIR angle will be ejected form the light guide close to the light source 930. Light entering the light guide 930 nearly horizontal to the hologram 940 will propagate through a larger portion of the light guide 920, with the angle between the respective light rays and the hologram 940 increasing e.g., increasingly more normal with each reflection from the first and second surfaces 922, 924 of the light guide 920, until the angle is within the acceptance angle of the hologram 940.

In certain embodiments, the difference in angles between the first and second surfaces 922, 924 of the light guide 920, also referred to as the taper angle, is relatively small, such as less than 1 degree. The embodiments of light guides illustrated herein, such as in FIGS. 9-11, include exaggerated tapering in order to better illustrate the various embodiments of light guides that are possible in accordance with the systems and methods described herein.

FIG. 9 illustrates exemplary paths of two light rays 950, 952 that are emitted into the light guide 920 from the light source 930 at different angles. In this example, upon entry of the rays 950, 952 into the light guide 920, an angle between ray 952 and the hologram 940 is larger than an angle between the ray 950 and the hologram. Thus, the ray 952 will reach the acceptance angle of the hologram 940 at a position nearer the light source 930 than the ray 950. As illustrated in FIG. 9, after reflection from the first and second surfaces 922, 924, the angles of the rays 950, 952 with reference to the hologram 940 has increased by twice the taper angle of the light guide 920. Accordingly, if the light guide 920 containing the embedded hologram 940 has an acceptance angle of 45 degrees and the taper angle of the light guide 920 is one-half degree, then the angle of each ray, in reference to the hologram, will increase by about 1 degree after reflecting from the first and second surfaces 222, 224 of the light guide. The angles of the rays 950, 952 are exaggerated to better illustrate the changes in angles of the rays as they propagate through the light guide 920.

In the embodiment of FIG. 9, the hologram 940 is parallel to the second surface 924 and, thus, the angle of rays incident and reflected from the second surface 924 are the same as the angles of the incident and reflected rays passing through the hologram. No change in angle is introduced by reflection from the second surface 924 because the hologram 940 is oriented the same as the second surface 924. In contrast, the first surface is tilted with respect to the hologram. In particular, in this embodiment, the relative angle between the hologram 940 and the first surface 922 is equal to the taper angle. Accordingly, angles of light rays reflecting from the first surface 922 are shifted by twice the taper angle, and the angles of light rays reflecting from the second surface 924, which is parallel to the hologram, are unchanged relative to the hologram. In other embodiments, the hologram 940 may not be parallel to either of the first and second surfaces such that each surface is tilted with respect to the hologram and thus the angle of the rays as measured with respect to the hologram is altered upon reflection from each surface. As a general rule, therefore, the angle of a light ray is changed by about twice the taper angle of a light guide after reflecting from both the top and bottom surfaces of the light guide.

For illustration purposes, the light guide 920 is illustrated having a taper angle of 0.5 degrees. With this taper angle, the angle of a light ray has changed by about 1.0 degrees after reflecting from the first and second surfaces 922, 924. As noted above, with the second surface 924 parallel to the hologram 940, the 1.0 degree change in angle of light rays all occurs as a result of a reflection off of the first surface 922, while the angle of the light rays with reference to the hologram 940 are not changed due to reflection from the second surface 924.

The exemplary hologram 940 has an acceptance angle of between 44.5 and 45.5 degrees. Thus, when the ray 952 enters the light guide 920 at an angle of about 43 degrees, the ray 952 is 1.5 degrees outside of the acceptance angle of the hologram and, thus, two reflections from the first surface 922 will increase the angle of the ray 952 to about 45 degrees so that it is within the acceptance angle of the hologram 940. Similarly, when the ray 950 enters the light guide 920 at an angle of about 42 degrees, the ray 950 is 2.5 degrees outside of the acceptance angle of the hologram and, thus, three reflections from the first surface 922 will increase the angle of the ray 950 to about 45 degrees so that it is within the acceptance angle of the hologram 940.

As shown in FIG. 9, when different angles of light are emitted from the light source 930, the light guide 920 advantageously causes rays of light to be ejected from the light guide 920 at different positions between the first end 927 and the second end 926 of the light guide 920. As noted above, in other embodiments the acceptance angle may be wider or narrow than the exemplary 1 degree acceptance angle width described with reference to FIG. 9. Additionally, the range of acceptance angles may be centered around other angles, such as 30, 35, 40, 50, 55, or 60 degrees, for example. The taper angle of a light guide may also be varied in other embodiments, such as to 0.1, 0.2, 0.8, 1, 2, 4, or 8 degrees tapering. In one embodiment, a light guide's taper angle (e.g., 0.5 degrees in FIG. 9) is less than about one-half of the hologram's range of acceptance angles (e.g., 1 degree in FIG. 9) so that individual light rays will not skip over the acceptance angle and fail to be ejected by the hologram.

Figure 10A:
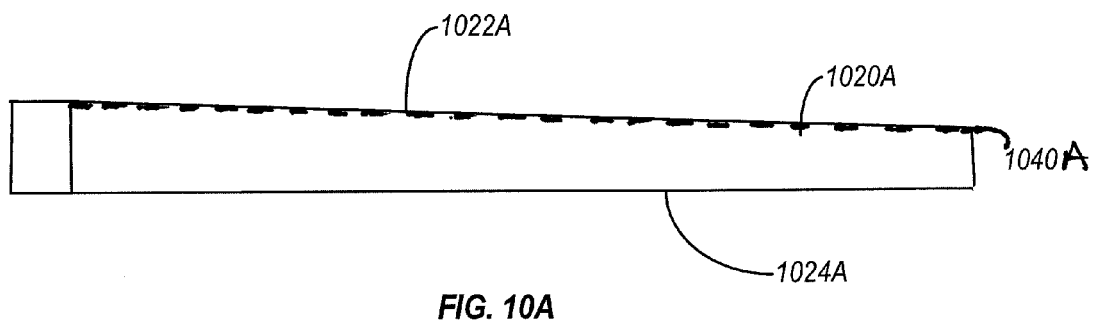
FIG. 10A is a cross section of a tapered light guide having a hologram positioned proximate a first surface of the light guide.
Figure 10B:
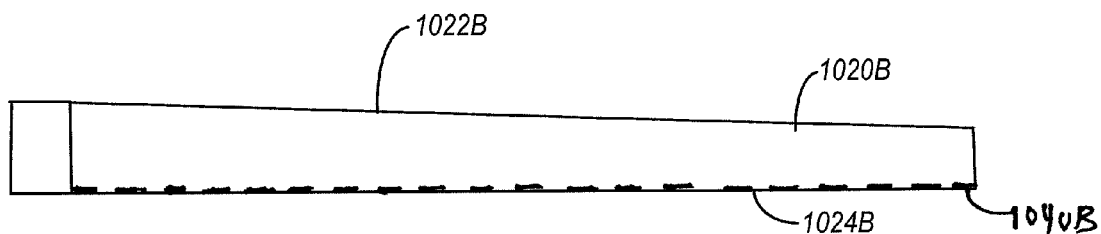
FIG. 10B is a cross section of a tapered light guide having a hologram positioned proximate a second surface of the light guide.

FIGS. 10A and 10B are cross sections of tapered light guides 1020A and 1020B, each comprising first surfaces 1022 and second surfaces 1024. In the embodiment of FIG. 10A, the light guide 1020A comprises a hologram 1040A positioned proximate the first surface 1022A, while in the embodiment of FIG. 10B, the light guide 1020B comprises a hologram 1040B positioned proximate the second surface 1024B of the light guide 1020B. Advantageously, the holograms 1040 within the light guides 1020, and other light guides, may be designed so that their position within the light guides can be varied without significant impact on the functionality of the light guides. Depending on the manufacturing process used to fabricate a light guide, the hologram may be more easily embedded in the light guide on the first surface 1022 or second surface 1024, rather than in a middle portion of the light guide, such as the hologram 940 of light guide 920. In other embodiments, the hologram may be positioned at other locations within the light guides. In one embodiment, the hologram 1040A is a reflective hologram configured to reflect light rays that are within the acceptance angle so that they are ejected from the light guide 1020A. In one embodiment, the hologram 1040B is a transmissive hologram configured to transmit all light rays and to adjust the angle of light rays that are within the acceptance angle so that they are ejected from the light guide 1020B. Generally, although not always, both transmissive and reflective holograms transmit light rays that are outside of the acceptance angle of the respective holograms with little or no effect on the angles of those light rays.

FIGS. 11A-11F are each cross sections of other embodiments of light guides 1120A-1120F each having a hologram 1140 embedded in the light guide. Each of the light guides 1120A-1120F comprise first and second opposing surfaces 1122, 1124 having at least one portion of the first and/or second surfaces tilted with respect to the other surface so as to provide variation in the distance separating at least portions of the first and second surfaces 1122, 1124. These tilted portions of the light guides 1120 advantageously adjust the angles of light rays that propagate through the light guides 1120. As described above with reference to FIG. 9, by adjusting the propagation angles of light rays within the light guides 1120, individual rays will reach an acceptance angle of the holograms 1140 at various positions along a length of the light guides 1120. In this way, in some embodiments light that is ejected from the light guides 1120 by the holograms 1140 may be more evenly distributed along a length of the light guides 1120.

Figure 11A:
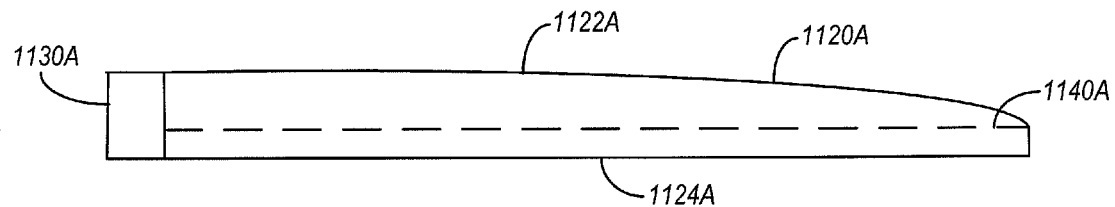
FIGS. 11A-F are cross sections of other embodiments of light guides having a hologram embedded in the light guide.

FIG. 11A illustrates a light guide 1120A having an accelerated taper between the first and second surfaces 1122A, 1124A. Thus, as the light rays move further away from the light source 1130A, larger deflection of light incident on the first surface is provided. For example, the first surface 1122A near the light source 1130A may be tilted at an angle of 1 degree while the first surface 1122A far from the light source 1130A may be tilted at an angle of 2, 3, or 4 degrees or more. This tilt may progressively increase with increasing distance from the light source as shown in FIG. 11A. As a result, in certain embodiments the first surface 1122A is curved.

Figure 11B:
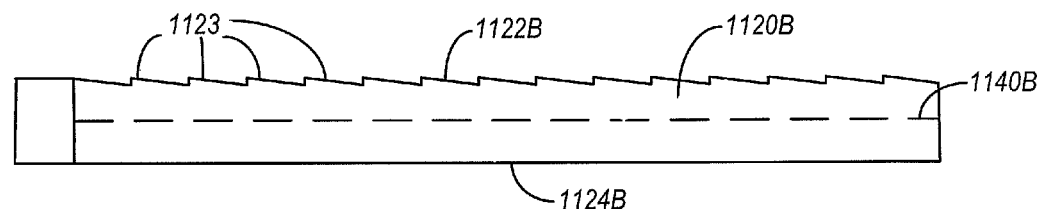

Since a tilt in the first surface 1122 provides the deflection of the light rays in the light guide, a light guide 1120B comprising a plurality of ridges 1123 across the length of the first surface 1122B may work just as well as a single tilted surface like the flat surface shown in FIG. 9. In a similar manner as described above, each of the ridges 1123, adjusts the angle of light reflected from each ridge 1123 with respect to the hologram 1140B. In this embodiment, the ridges 1123 are configured so as to adjust the angle of incident light rays with respect to the hologram 1140B so that the light rays reach the acceptance angle of the hologram 1140B at various locations along a length of the light guide 1120B. Each of the ridges has tilt, e.g., of about 0.5 degrees and, accordingly, reflect light incident thereon in a similar manner as a wedge shaped light guide structure such as shown in FIG. 9. Advantageously, however, the total thickness variation of the light guide is reduced for a light guide such as shown in FIG. 11B than a light guide such as shown in FIG. 9 as the thickness is increased at the start of each ridge. Accordingly, thinner light guides can provide the same amount of tilt as wedge shaped light guides that need large thickness variation and thus overall larger thickness, e.g., at the light source end.

Figure 11C:
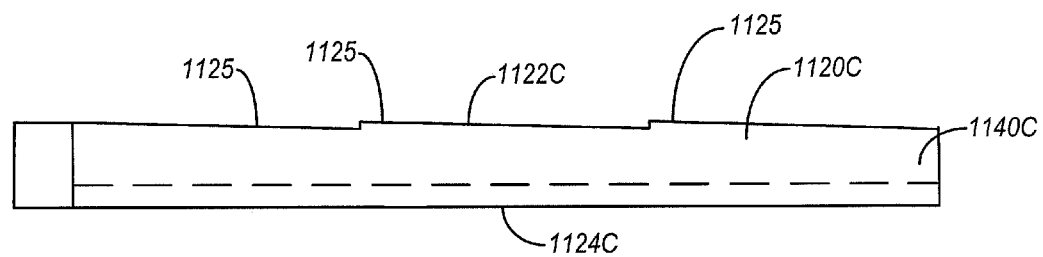

FIG. 11C illustrates a light guide 1120C comprising a plurality of ridges 1125 across the length of the first surface 1122C. Similar to the embodiment of FIG. 11B, the ridges 1125 are configured to adjust the angles of incident light rays so that after one or more reflections from the ridges 1125, respective light rays will be within an acceptance angle of the hologram 1140C and will, therefore, be ejected from the light guide 1120C on to one or more display devices. The angle of the ridges 1123, 1125, (FIGS. 11B and 11C) and the number of ridges that are included in either the first surface 1122 or second surface 1124 of a light guide may be adjusted according to design parameters and manufacturing constraints. In one embodiment, ridges are positioned on the second surface 1124 so that dirt and other substances are prevented from lodging in the ridges.

Other configurations are possible. Ridges with different shapes are also possible. For example, although the first surface 1122A has a saw-toothed-like pattern, wherein the ridges include a step portion and a tilted planar portion, in other designs the tilted portion need not be planar or the step height need not be identical from one step to another. Additionally, the spacing from step-to-step may vary and the tilts and shapes may be different from ridge-to-ridge.

Figure 11D:
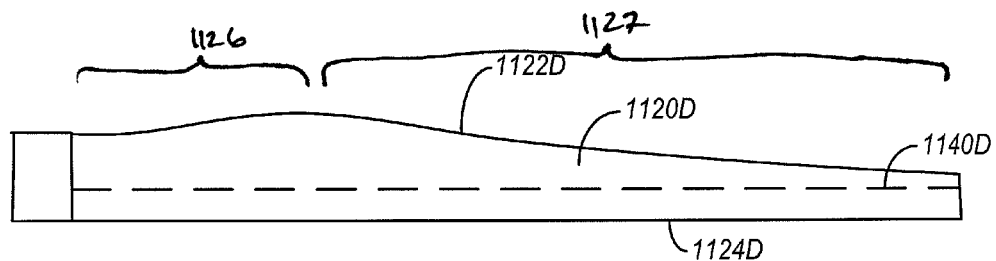

FIG. 11D illustrates a light guide 1120D comprising a first surface 1122D that slopes away from planar second surface 1124D across a first portion 1126 of the light guide 1120D. In this embodiment, the first surface 1122D slopes towards the second surface 1124D across a second portion 1127 of the light guide 1120D. Accordingly, deflecting of light in the first and second portions 1126, 1127 is different. The reflectance angle of light rays that are incident on the first surface 1122D in the first portion 1126 of the light guide 1120D will decrease, while the reflectance angle of light rays that are incident on the first surface 1122D in the second portion 1127 of the light guide 1120D will increase. In one embodiment, an end of the light guide 1120D near the light source receives more light rays than need to be ejected at that portion of the light guide 1120D. Thus, in order to normalize the ejection of lights rays along the length of the light guide 1120D, angles of the light rays in the first portion 1126 are not adjusted by a tapering of the light guide. Accordingly, in this first portion 1126, the number of light rays that are ejected by the hologram 1140D may actually decrease. As the light rays pass the first portion 1126 and enter the second portion 1127, the angles of the light rays are adjusted due to tapering of the second portion 1127 and additional light rays will be ejected from the light guide 1120D.

Figure 11E:
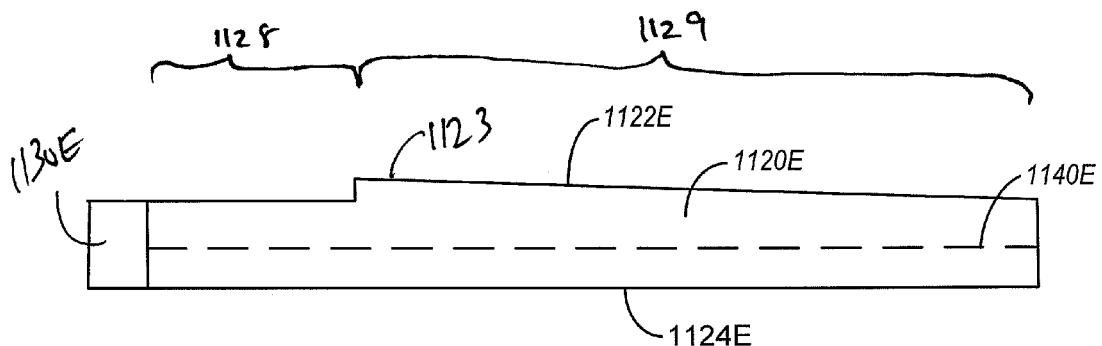

FIG. 11E illustrates a light guide 1120E comprising a single ridge 1123. In this embodiment, in a first portion 1128 of the light guide 1120E the first and second surfaces 1122E, 1124E are parallel. However, in a second portion 1129 of the light guide 1120E the first surface 1126 is titled with respect to the second surface 1129. Increased deflection of light is provided in the second portion 1129 with reference to the hologram 1140E. Accordingly, in the embodiment of FIG. 11E, only light rays that are emitted by the light source 1130E at the acceptance angle of the hologram 1140E will be ejected in the first portion 1128 of the light guide 1120E, while in the second portion 1129 of the light guide 1120, rays that are emitted by the light source 1130E at less than the acceptance angle will experience an angle increase with each reflection from the first and second surfaces 1122E, 1124E until the respective light rays are at the acceptance angle of the hologram 1140E and are ejected from the light guide 1120E.

Figure 11F:
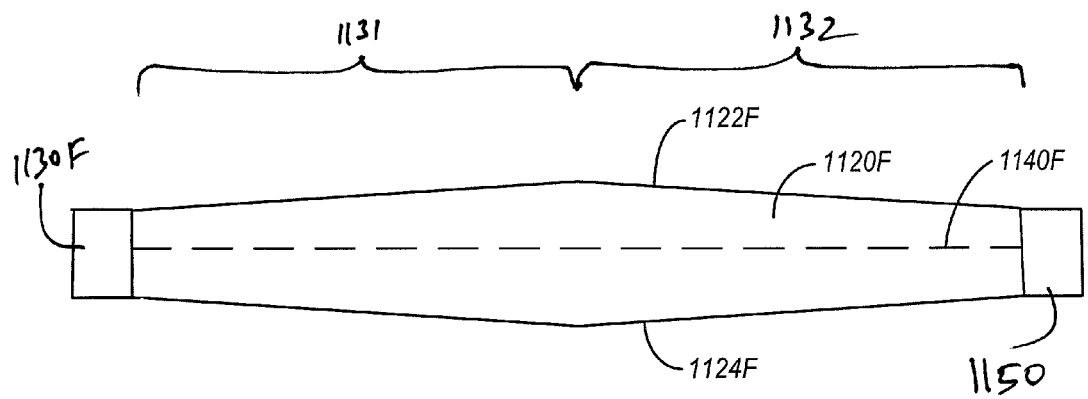

FIG. 11F illustrates a light guide 1120F comprising non-planar first and second surfaces 1122F, 1124F. In this embodiment, a distance between the first and second surfaces 1122F, 1124F increases in a first portion 1131 of the light guide 1120F and decreases in a second portion 1132 of the light guide 1120F. Both the first portion 1131 and the second portion 1132 themselves are planar in this embodiment although other shapes may be used. In the embodiment of FIG. 11F, a light source 1130F is positioned proximate the first portion 1131 and another light source 1150 is positioned proximate the second portion 1132. In this configuration, angles of light rays from the light source 1130F decrease through the first portion 1131 and increase through the second portion 1132, while light rays from the light source 1150 decrease through the second portion 1132 and increase through the first portion 1131. Various embodiments can provide more uniform light distribution when light sources on opposite ends of the light guide are provided.

In another embodiment, the second light source 1150 may be replaced by a reflector so that light that is not ejected by the hologram 1140F as it passes from the light source 1130F to the reflector is reflected back into the light guide 1120F in an opposite direction. In this embodiment, an angle of the light rays may be adjusted by reflections on the first and second surfaces 1122F, 1124F in the first portion 1131 of the light guide 1120F towards the acceptance angle of the hologram 1140F.

The embodiments described above are exemplary and are not intended to limit the scope of possible light guide configurations that provide the advantageous functions described herein. In certain embodiments, portions of both the first and second surfaces 1122, 1124 of light guides 1120 are tilted with respect to the hologram 1140. A wide variety of variations in design, and configuration, and use are possible.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. An apparatus comprising:
    a light guide having first and second planar opposing surfaces with at least a portion of the first surface tilted with respect to the second surface to define a taper angle, the light guide further including sides disposed about the first and second surfaces; and
    a hologram disposed in the light guide, the hologram configured to eject injected light out of the light guide, the tilted first surface altering the distribution of angles that light is incident on the hologram as the light propagates through the light guide, wherein
        the hologram ejects light rays that are incident on the hologram within a range of acceptance angles,
        the taper angle is less than about one-half of the range of acceptance angles and is less than about 2 degrees, and
        the light guide is configured to allow some of the light rays to reflect more than once off of one of the first and second opposing surfaces so that the light rays are incident on the hologram within the range of acceptance angles.

2. The apparatus of claim 1, wherein the hologram is positioned on the first surface.

3. The apparatus of claim 1, wherein the hologram is positioned on the second surface.

4. The apparatus of claim 1, wherein the hologram is positioned between the first and second surfaces.

5. The apparatus of claim 1, wherein the range of acceptance angles is less than about 0.25 degree.

6. The apparatus of claim 1, wherein the range of acceptance angles is less than about 0.5 degree.

7. The apparatus of claim 1, wherein the range of acceptance angles is less than about 1 degree.

8. The apparatus of claim 1, further comprising a spatial light modulator disposed with respect to the light guide to receive the light ejected from the light guide, said spatial light modulator comprising interferometric modulators.

9. An apparatus comprising:
    a light source;
    a light guide having first and second planar opposing surfaces with at least a portion of the first surface tilted with respect to the second surface to define a taper angle, the light guide further including sides disposed about the first and second surfaces, the light source disposed with respect to one of the sides to inject light into the light guide;
    a hologram disposed in the light guide, the hologram configured to eject the injected light out of the light guide, the tilted first surface altering the distribution of angles that the light is incident on the hologram as the light propagates through the light guide, wherein
        the hologram ejects light rays that are incident on the hologram within a range of acceptance angles,
        the taper angle is less than about one-half of the range of acceptance angles,
        the light guide is configured to allow some of the light rays to reflect more than once off of one of the first and second opposing surfaces so that the light rays are incident on the hologram within the range of acceptance angles, and
        the taper angle is less than about 2 degrees; and
    a display element disposed with respect to the light guide to receive the light ejected from the light guide.

10. The apparatus of claim 9, wherein the light guide is wedge shaped.

11. The apparatus of claim 9, wherein at least a portion of the second surface is tilted with respect to the hologram.

12. The apparatus of claim 9, wherein the light guide comprises a plurality of tilted portions, and wherein each of the plurality of tilted portions are at a first angle with respect to the hologram.

13. The apparatus of claim 9, wherein a first tilted portion is at a first angle with respect to the hologram and a second tilted portion is at a second angle with respect to the hologram.

14. The apparatus of claim 9, wherein the hologram is configured to eject light out of the light guide through the first surface of the light guide.

15. The apparatus of claim 9, wherein the hologram is configured to eject light out of the light guide through the second surface of the light guide.

16. The apparatus of claim 9, wherein the hologram is positioned on the first surface.

17. The apparatus of claim 9, wherein the hologram is positioned on the second surface.

18. The apparatus of claim 9, wherein the hologram is positioned between the first and second surfaces.

19. The apparatus of claim 9, wherein the range of acceptance angles is less than about 0.25 degree.

20. The apparatus of claim 9, wherein the range of acceptance angles is less than about 0.5 degree.

21. The apparatus of claim 9, wherein the range of acceptance angles is less than about 1 degree.

22. The apparatus of claim 9, wherein the hologram reflects light incident on the hologram that is within the range of acceptance angles so that the reflected light is ejected from the light guide towards the display element.

23. The apparatus of claim 9, wherein the hologram transmits light incident on the hologram that is within the range of acceptance angles so that the transmitted light is ejected from the light guide towards the display element.

24. The apparatus of claim 9, wherein an angle of respective light rays with respect to the hologram is increased when the respective light rays are reflected from the first surface.

25. The apparatus of claim 9, wherein the display element is positioned proximate to the first surface.

26. The apparatus of claim 9, wherein the display element is positioned proximate to the second surface.

27. The apparatus of claim 9, wherein the light source and the light guide comprise a backlight.

28. The apparatus of claim 9, wherein the light source and the light guide comprise a frontlight.

29. The apparatus of claim 9, wherein the display element comprises one of an EL, LCD, OLED, STN LCD, and TFT LCD display element.

30. The apparatus of claim 9, wherein the display element comprises a spatial light modulator.

31. The apparatus of claim 30, wherein the spatial light modulator comprises an interferometric modulator.

32. The apparatus of claim 1, wherein the first surface comprises at least one step, wherein the hologram is disposed on the second surface.

33. The apparatus of claim 32, wherein the at least one step comprises a surface that is normal to the hologram.

34. The apparatus of claim 32, wherein the at least one step comprises a surface that is inclined with respect to the hologram.

35. The apparatus of claim 9, wherein the light source is positioned proximate a first end of the light guide.

36. The apparatus of claim 35, wherein a second light source is positioned proximate a second end of the light guide.

37. The apparatus of claim 35, wherein a reflector is positioned proximate a second end of the light guide.

38. The apparatus of claim 9, further comprising:
- a display comprising the light source, the light guide, the hologram, and the display element;
- a processor that is configured to communicate with the display element, the processor being configured to process image data; and
- a memory device that is configured to communicate with the processor.

39. The apparatus of claim 38, further comprising an input device configured to receive input data and to communicate the input data to the processor.

40. The apparatus of claim 38, further comprising a driver circuit configured to send at least one signal to the display element.

41. The apparatus of claim 40, further comprising a controller configured to send at least a portion of the image data to the driver circuit.

42. The apparatus of claim 38, further comprising an image source module configured to send the image data to the processor.

43. The apparatus of claim 42, wherein the image source module comprises at least one of a receiver, transceiver, and transmitter.

* * * * *